F. A. BRUNDAGE.
UTENSIL LIFTER.
APPLICATION FILED JAN. 28, 1916.
1,222,262.
Patented Apr. 10, 1917.
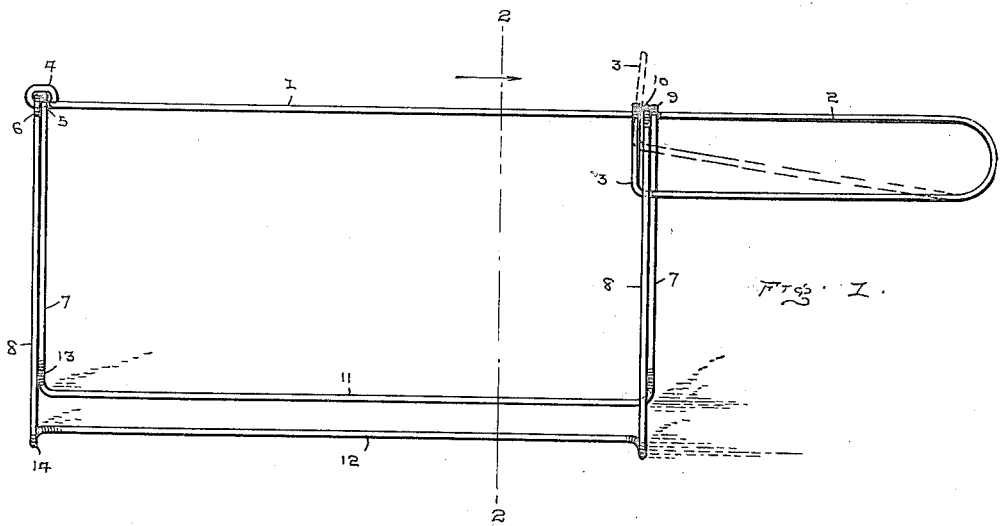
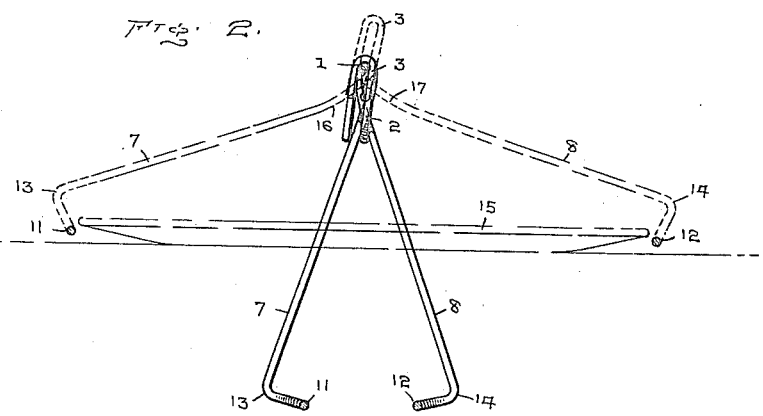
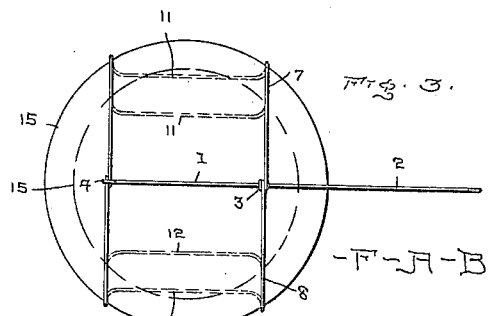
Inventor
F. A. Brundage
By W. J. FitzGerald
Attorney
Witnesses

UNITED STATES PATENT OFFICE.

FRED A. BRUNDAGE, OF BELMONT, NEW YORK.

UTENSIL-LIFTER.

1,222,262.   Specification of Letters Patent.   Patented Apr. 10, 1917.

Application filed January 28, 1916. Serial No. 74,816.

*To all whom it may concern:*

Be it known that I, FRED A. BRUNDAGE, a citizen of the United States, residing at Belmont, in the county of Allegany and State of New York, have invented certain new and useful Improvements in Utensil-Lifters; and I do hereby declare the following to be a full, clear, and exact description of the invention, such as will enable others skilled in the art to which it appertains to make and use the same.

My invention relates to new and useful improvements in utensil lifters and more particularly to that class adapted for removing heated pans, plates and the like from the oven of a stove or for removing them from any part of the stove, and my object is to provide a handle structure, preferably of wire, to which are hingedly attached gripping arms for engagement with the utensils.

And a further object is to provide means in connection with the handle for spreading said gripping arms whereby they may be readily engaged with the peripheral edges of the utensils.

Other objects and advantages will be hereinafter set forth and more particularly pointed out in the accompanying specification.

In the accompanying drawings which are made a part of this application,

Figure 1 is a perspective view of the device in closed position.

Fig. 2 is a sectional view thereof as seen on line 2—2 of Fig. 1, showing the device in closed position by full lines and in operative position by dotted lines, and Fig. 3 is a top plan view of the device as applied to use.

Referring to the drawings in which similar reference numerals designate corresponding parts throughout the several views, 1 indicates a handle bar, one end of which is formed into a loop 2 to provide a hand grip, the free end of the loop 2 being bent at right angles to the trend of the handle bar and formed into a hook member 3, said hook member being elongated so that the lower section of the loop 2 will normally rest parallel with the upper section thereof but may be moved upwardly and disposed at an angle to the upper section of the loop when pressure is applied thereto as shown by dotted lines in Figs. 1 and 2.

The end of the handle bar opposite the loop 2 is bent upon itself to form an eye 4 through which extends eye sections 5 and 6 of gripping arms 7 and 8, said arms being in pairs and arranged adjacent the opposite ends of the handle bar, the gripping arms adjacent the loop 2 having eyes 9 and 10 which surround the handle bar 1 adjacent the hook member 3, the lower bar of the loop 2 passing between the arms 7 and 8 having the eyes 9 and 10 thereon.

The gripping arms 7 and 8 are connected respectively by gripping bars 11 and 12 which are formed integral with the arms, the ends of the arms having inwardly curved sections 13 and 14 at their outer or lower ends to position the gripping bars in advance of the arms whereby said gripping bars will readily pass below and engage the under face of the projecting portions of a receptacle, as for instance a plate or pan 15, as shown in Figs. 2 and 3, the curved offset sections permitting the gripping bars to readily pass below the edges of the plate a sufficient distance to securely hold the plate when a lifting action is applied to the handle bar.

The upper ends of the gripping arms 7 and 8 having the eyes 9 and 10 are provided with inwardly bowed portions 16 and 17 respectively at a point adjacent the eyes 9 and 10 so that when the gripping arms are in their closed position, the bowed portions will overlap each other and by arranging the gripping arms in this manner it will be readily seen that when the lower section of the loop 2 is forced upwardly, as shown by dotted lines in Fig. 1, the arms 7 and 8 will be separated and the gripping bars moved outwardly a sufficient distance to pass over the edges of a utensil and by properly curving the bowed portions 16 and 17, the gripping arms and bars may be brought to a plane substantially horizontal and parallel with the handle bar 1 thereby opening the gripping bars to their full capacity.

By arranging the bowed portions in the manner shown, the gripping arms and bars connecting the same may be readily manipulated to engage with the utensil even when the space within the oven is very limited as it does not require the turning of the handle portion sidewise to open the gripping parts, as is true of other devices of this nature.

It will likewise be seen that utensils of various widths or diameters may be handled by the device for as soon as the gripping parts have been separated and disposed over the utensil and pressure is released from the lower section of the loop 2, said gripping parts will descend by gravity and the gripping parts pass below the protruding parts of the utensil so that when a lifting action is imparted to the handle bar, the utensil will be carried by the gripping bars.

And it will likewise be seen that as the entire device is preferably formed of sections of wire, it can be very cheaply constructed and will be indestructible from use and furthermore that the device can be very quickly attached to or removed from engagement with the utensil.

Having thus fully described my invention what I claim as new and desire to secure by Letters Patent of the United States, is:—

1. A lifting device comprising a handle bar having an eye at one end and an elongated loop at the opposite end, said loop having a hook member engaging the handle bar, gripping arms arranged in pairs having eyes at one end adapted to engage parts of the handle bar, gripping bars integral with said pairs of gripping arms, said arms at their connection with the gripping bars having inwardly curved sections, one pair of arms having oppositely bowed portions adapted to be engaged by the hook carrying portion of the loop whereby when said portion of the loop is moved upwardly the gripping parts will be separated.

2. A lifting device comprising a handle bar having a loop portion at one end thereof, gripping arms arranged in pairs and pivoted to said handle bar, one bar of said loop member passing between one pair of the gripping arms, said latter gripping arms having bowed portions adjacent their pivotal ends whereby when the bar of the loop passing between said gripping arms is moved upwardly said gripping arms will be separated.

In testimony whereof I have signed my name to this specification in the presence of two subscribing witnesses.

FRED A. BRUNDAGE.

Witnesses:
LEON W. PAUL,
H. R. SORTORE.

Copies of this patent may be obtained for five cents each, by addressing the "Commissioner of Patents, Washington, D. C."